United States Patent [19]
Vickery et al.

[11] Patent Number: 5,771,624
[45] Date of Patent: Jun. 30, 1998

[54] FISH BITE ALERT

[76] Inventors: Roger D. Vickery, 890 Forest Mills Rd., Waukon, Id. 52172; John C. May, 2707 South Ave., La Crosse, Wis. 54601; Thomas J. Arendt, Rte. 2, Box 60, Norwalk, Wis. 54648

[21] Appl. No.: 589,339

[22] Filed: Jan. 22, 1996

[51] Int. Cl.$^6$ .................................................. A01K 97/12
[52] U.S. Cl. ..................................................... 43/17; 43/25
[58] Field of Search ........................................... 43/17, 25

[56]  References Cited

U.S. PATENT DOCUMENTS

| | | | |
|---|---|---|---|
| 2,770,907 | 11/1956 | Sharer | 43/17 |
| 2,964,869 | 12/1960 | Berghoff et al. | 43/17 |
| 2,978,828 | 4/1961 | McQuiston et al. | 43/17 |
| 3,846,930 | 11/1974 | Brown | 43/25 |
| 3,882,629 | 5/1975 | Kaye | 43/17 |
| 3,959,910 | 6/1976 | Montgomery | 43/17 |
| 4,118,882 | 10/1978 | Gorsky | 43/17 |
| 4,178,712 | 12/1979 | Williams | 43/17 |
| 4,266,217 | 5/1981 | Kao et al. | 43/17 |
| 4,458,437 | 7/1984 | Ou | 43/17 |
| 4,471,555 | 9/1984 | Soukup | 43/17 |
| 4,479,321 | 10/1984 | Welstead | 43/17 |
| 4,541,195 | 9/1985 | Delaney | 43/17 |
| 4,586,284 | 5/1986 | Westwood, III | 43/17 |
| 4,794,719 | 1/1989 | Rabino | 43/17 |
| 5,063,373 | 11/1991 | Lindsley | 340/573 |
| 5,261,180 | 11/1993 | Foster et al. | 43/17 |
| 5,293,710 | 3/1994 | Mills | 43/17 |

FOREIGN PATENT DOCUMENTS 2051564  1/1981  United Kingdom ............. A45F 5/00

Primary Examiner—Joseph J. Hail, III
Assistant Examiner—Henry Blackburn
Attorney, Agent, or Firm—Robert J. Harter

[57] ABSTRACT

A fish bite alert device includes a 3-position adjustable gripper that provides a positive line gripping action in a set mode yet completely releases the line, entirely free of the fish bite alert device, in a release position. The gripper is illuminated for night fishing. The fish bite alert device also includes a 3-mode selector switch to choose light-only operation, light and buzzer operation, and an off position. The light assists the hearing impaired, while the buzzer is beneficial to the sight impaired.

3 Claims, 3 Drawing Sheets

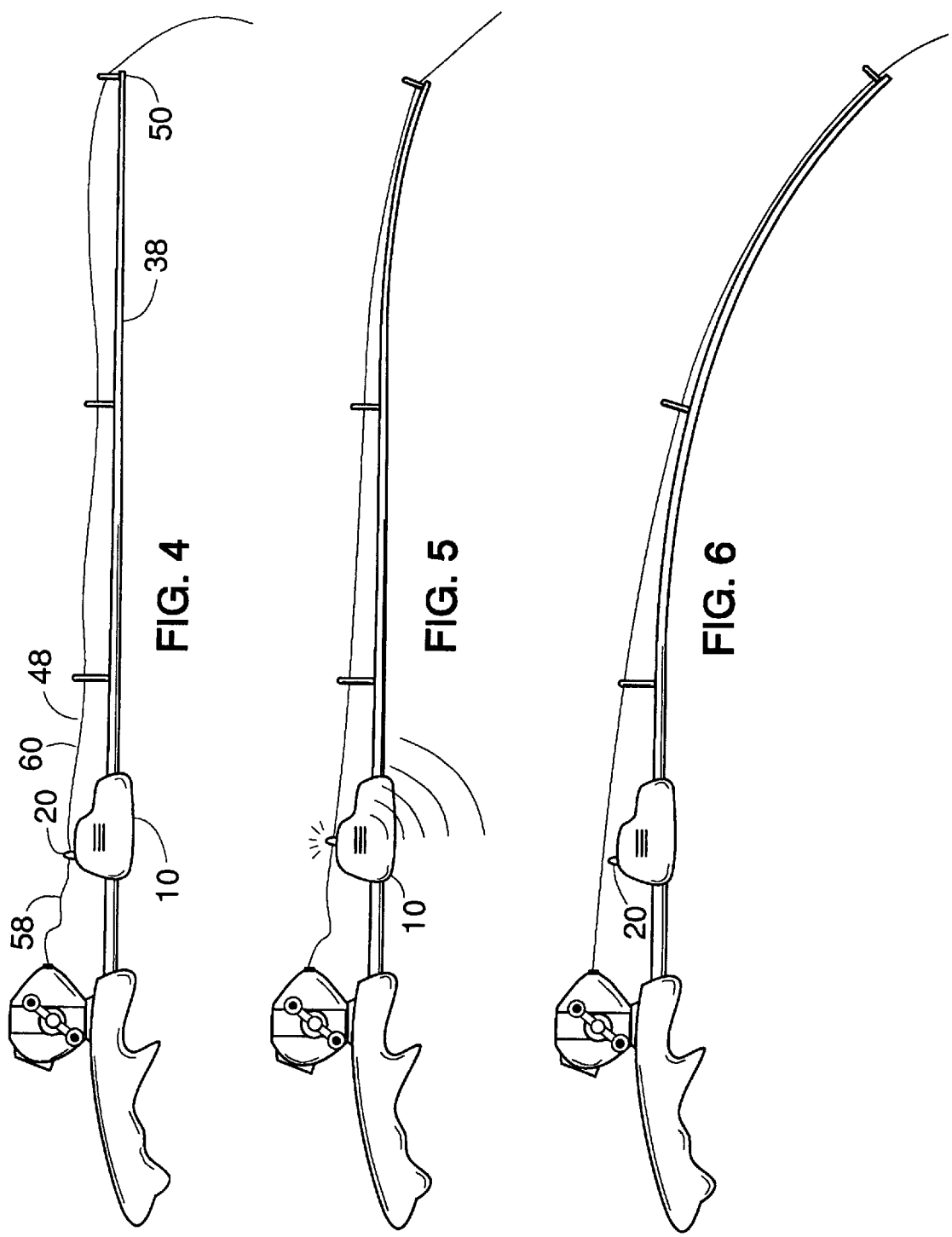

FISH BITE ALERT

BACKGROUND OF THE INVENTION

1. Field of the Invention

The subject invention generally pertains to fishing rod signal and more specifically to a multiple mode fish bite alert with adjustable, positive actuation.

2. Description of Related Art

Fishing rod mountable devices for indicating a fish bite are currently available. Some indicate a bite using a light, and others use an audio alarm. The devices employ a variety of trigger mechanisms. An ineffective trigger seems to be a common problem with existing bite alerts; however, there are several other problems as well.

Some of these other problems include lack of sensitivity adjustment, the device never totally releasing the fishing line, trip force affected by upstream line tension, difficult to set at night, and cumbersome means for attaching to a fishing rod.

To avoid the problems and limitations of existing fishing rod signals, it is an object of the invention to provide a bite alert device with a dual purpose light that signals a bite and also illuminates a gripper to facilitate setting the device while fishing at night.

A second object is to provide a selector switch that disables a buzzer when setting the device yet allows a light to illuminate a gripper style trigger.

A third object is to further employ the selector for turning the fish bite device off completely during transport or storage to protect the batteries.

A fourth object is to combine a gripper-style trigger with a lens cap to minimize overall size and maximize trigger illumination.

A fifth object is to provide a gripper-style trigger that automatically and totally releases the fish line in response to a strike.

A sixth object is to provide a trigger whose gripping force is independent of any upstream line tension so that the reel can be left in an unlocked state.

A seventh object is to provide a simple compact taper lock device that adapts to fishing rods of varying diameter.

An eight object is to provide a bite alert device responsive to line tension in a single-pass line to minimize the chance of tangling A the line and to simplify the setting of the device.

A ninth object is to provide an internal taper lock mechanism not having external clamps or screws that can snag a fish line.

A tenth object is to provide a bottom cap that prevents the bite alert device from completely leaving the rod in the event the taper lock releases.

An eleventh object is to provide a means for adjusting the line tension required to trip the bite alert.

A twelfth object is to provide a taper lock that adjusts to a wide range of rod diameters and requires no tools to adjust.

These and other objects of the invention are provided by a novel fish bite alert device comprising an illuminated 3-position gripper having a positive grip set position, a trip position, and a fully release position where the fish line is entirely free of the fish bite alert device. In addition, a 3-mode switch provides a choice of operating modes including 1) light only; 2) light and buzzer; and 3) an inactive mode.

BRIEF DESCRIPTION OF THE DRAWINGS

FIG. 4 is a side view of the invention in a set position.

FIG. 5 is a side view of the invention in a trip position.

FIG. 6 is a side view of the invention in a release position.

DESCRIPTION OF THE PREFERRED EMBODIMENT

Figure 1:
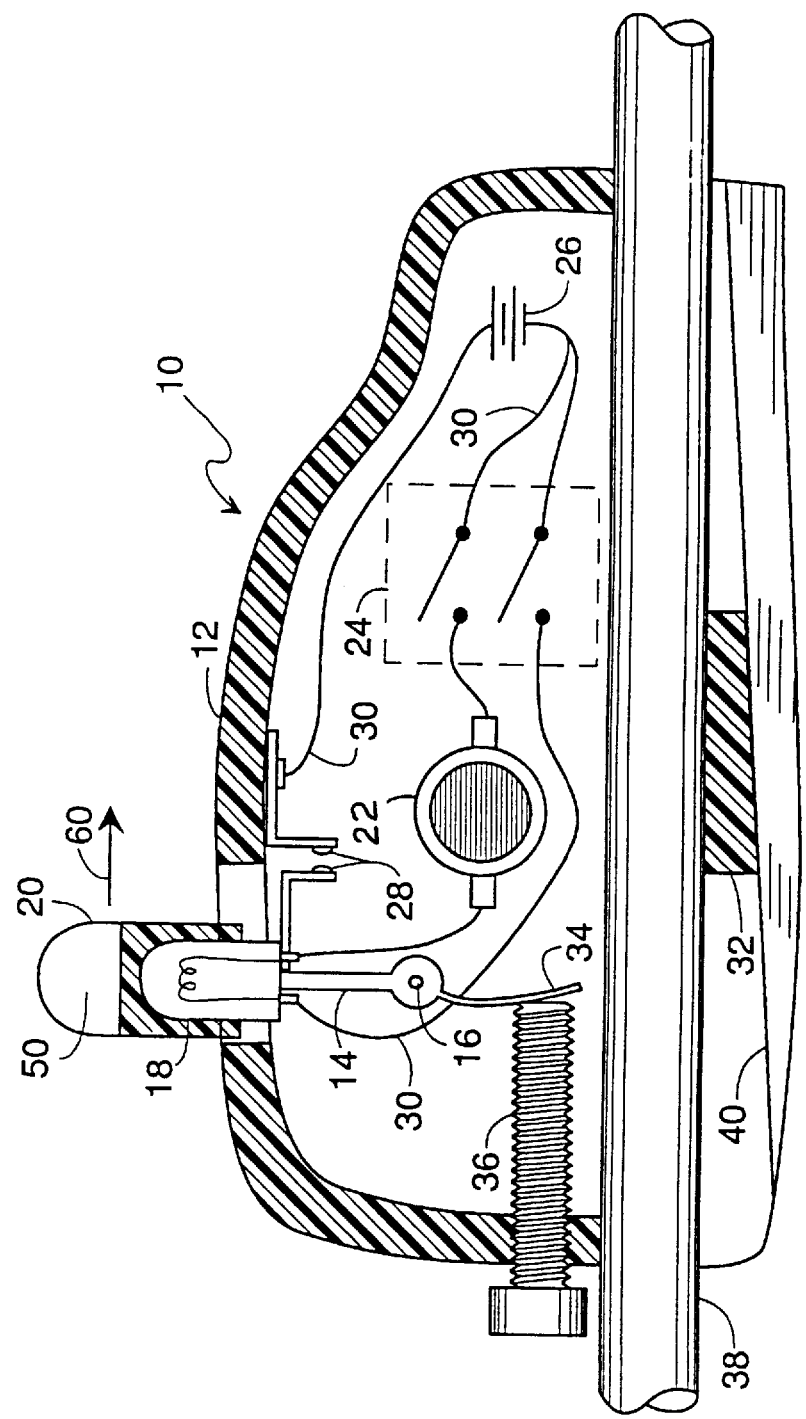
FIG. 1 is a side cross-sectional view of the invention.

A fish bite alert 10 of FIG. 1 includes a hollow plastic housing 12, a pivot arm 14 rotatably attached to housing 12 at pin 16, a light bulb 18 attached to pivot arm 14, a flexible 3-position gripper 20 being see-through (i.e.,transparent or translucent) to serve as a lens cap for bulb 18, a buzzer 22, a Switch 24, a battery 26, a set of electrical contacts 28, wires 30, a wedge 32, and a leaf spring 34 abutting an adjustment screw 36.

Figure 3:
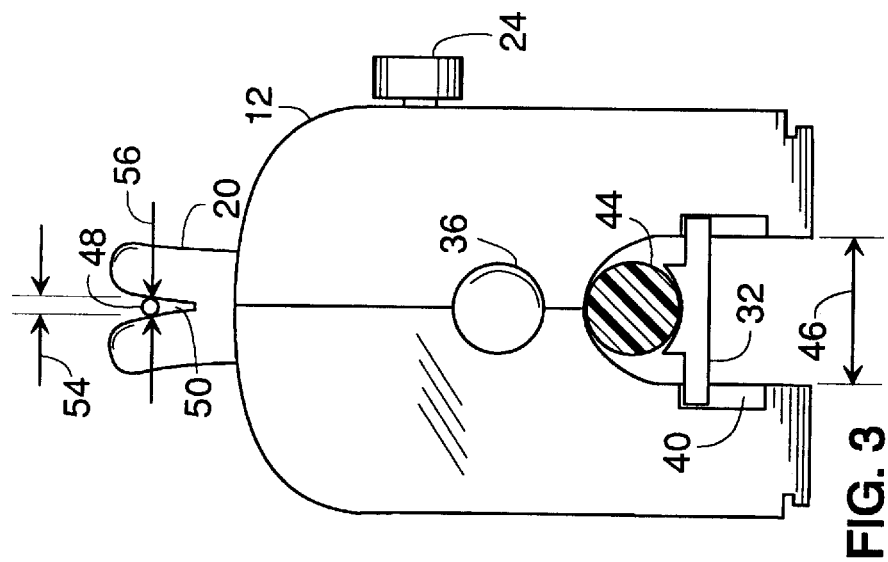
FIG. 3 is an end view of the invention in a set position.
Figure 2:
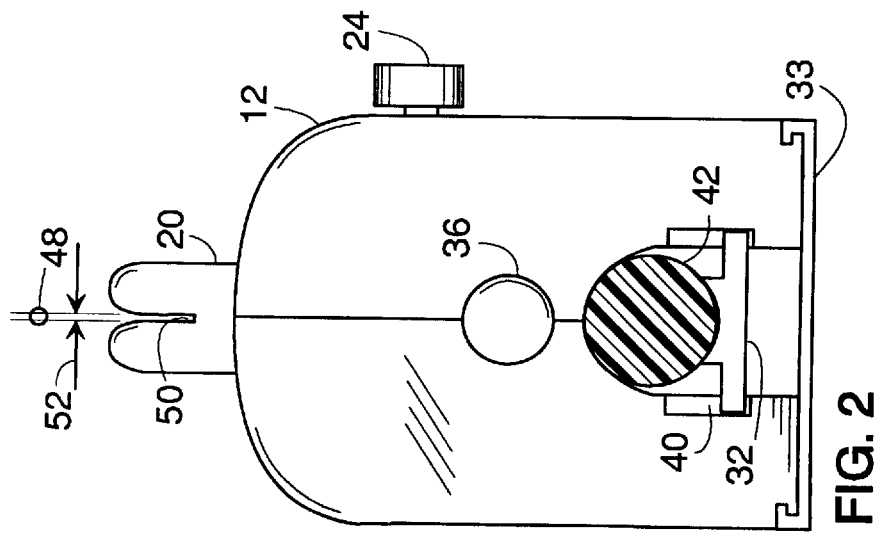
FIG. 2 is an end view of the invention in a release position.

Bite alert 10 attached to a fishing pole 38 by way of wedge 32. Wedge 32 slides along a ramp 40 to lock housing 12 to pole 38. FIGS. 2 and 3 illustrate how housing 12 attaches to a large diameter pole 42 (FIG. 2) and a small diameter pole 44 (FIG. 3). Opening 46 allows housing 12 to slip over poles 38, 42, and 44 with wedge 32 inserted along ramp 40 afterwards. A bottom cap 33 shown, in FIG. 2, slips over housing 12 to prevent bite alert 10 from falling off pole 38 in the event taper lock wedge 32 releases.

Three-position gripper 20 provides a set position, a trip position, and a release position as illustrated in FIGS. 4, 5, and 6, respectively.

In the set position. (FIG. 4), a fish line 48 is wedged into a crevice 50 of gripper 20. The unstressed predetermined minimum width 52 of crevice 50 (FIG. 2) is smaller than the diameter 54 of fish line 48 to provide a holding force 56 that pinches line 48 when line 48 is inserted in crevice 50 as shown in FIG. 3. Holding force 56 is a function of how tightly gripper 20 pinches line 48 and is substantially independent of the line tension on an upstream 58 and a downstream 60 side of gripper 20 (with downstream 60 being generally between gripper 20 and a rod tip 50). In the set position, the upstream line tension is substantially zero while the downstream line tension is so slight that adjustment screw 36 acting upon spring 34 is sufficient to pivot gripper 20 backward to open contacts 28. Contacts 28 being open turns any audio or visual alarm off. In the embodiment of FIG. 1, the alarm includes light,18 and buzzer 22.

Figure 7:
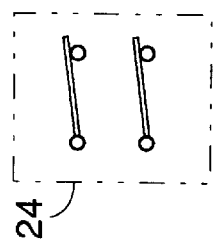
FIG. 7 is a schematic view of a switch in a mode where the light and buzzer are active.
Figure 8:
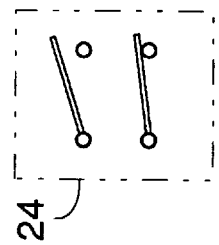
FIG. 8 is a schematic view of a switch in a mode where the light is active and the buzzer is deactivated.

The trip position (FIG. 5) occurs when a fish strikes and causes the downstream tension-to exceed predetermined limit set by adjustment 36. Exceeding this limit pulls gripper 20 forward (as indicated by arrow 60 of FIG. 1) and closes contacts 28. This allows the alarm to turn on, provided switch 24 is properly set. For example, with switch 24 set to a first mode, as shown in FIG. 7, electrical current from battery 26 is able to energize both light 18 and buzzer 22. With switch 24 set to a second mode, as shown in FIG. 8, light 18 turns on while buzzer 22 remains off when contacts 28 close. With switch 24 set to a third mode, as shown in.FIG. 1, light 18 and buzzer 22 remain off regardless of contacts 28. In the third mode, the alarm can be considered to be the visual indication that gripper 20 moved forward.

The release position (FIG. 6) automatically occurs when the line tension is so great that it pulls line 48 out from within crevice 50 and completely away from bite alert 10.

In one embodiment of the invention, gripper 20 is made of translucent silicone and pivot arm 14 with integral spring 34 is made of nylon.

Although the invention is described with respect to a preferred embodiment, modifications thereto will be apparent to those skilled in the art. Therefore, the scope of the invention is to be determined by reference to the claims which follow.

We claim:

1. A fish bite alert attachable to a fishing rod having a handle at one end and a rod tip at an opposite end, said fish bite alert being adapted to pinch a fish line in a single-pass configuration extending along a length of said fishing rod, said fish bite alert comprising:

a housing attachable to said fishing rod;

an alarm attached to said housing, said alarm including a light, said alarm having a status of on and off;

a 3-position gripper being illuminated by said light, said gripper formed of a flexible see-through material which is affixed to said light, both the gripper and the light being movably mounted to the housing said 3-position gripper being flexible to define a crevice of variable width, said 3-position gripper being respositionably attached to said housing, said 3-position gripper having a release position, a set position, and a trip position, wherein in said release position said fish line is spaced completely apart from said 3-position gripper with the width of said crevice being at a predetermined minimum and said alarm being off, in said set position said 3-position gripper applying a holding force pinching said fish line within said crevice with said fish line being in a single-pass configuration and said alarm being off, and in said trip position said 3-position gripper pinching said fish line within said crevice with said fish line being in a single-pass configuration and said alarm being on, said 3-position gripper being respositionable from said set position to said trip position in response to tension of said fish line between said 3-position gripper and said rod tip exceeding a predetermined limit, said 3-position gripper automatically shifting from said trip position to said release position in response to tension in said fish line drawing said fish line out from within said crevice, said holding force being independent of any tension of said fish line in said crevice; and an adjustment on said housing and co-acting with said 3-position gripper to vary said predetermined limit.

2. The fish bite alert of claim 1, further comprising a switch being 3-mode user selectable and wherein said alarm includes an audio signal, said switch having a first mode where said light and said audio signal respond to said trip position, a second mode where said audio signal is disabled and said light responds to said trip position, and a third mode where said light and said audio signal are disabled.

3. A fish bite alert attachable to a fishing rod having a handle at one end and a rod tip at an opposite end, said fish bite alert being adapted to pinch a fish line a single-pass configuration extending along a length of said fishing rod, said fish bite alert comprising:

a housing attachable to said fishing rod;

an alarm attached to said housing, said alarm including a light, said alarm having a status of on and off;

a 3-position gripper being illuminated by said light, said gripper formed of a flexible see-through material which is affixed to said light, both the gripper and the light being movably mounted to the housing said 3-position gripper being flexible to define a crevice of variable width, said 3-position gripper being repositionably attached to said housing, said 3position gripper having a release position, a set position, and a trip position, wherein in said release position said fish line is spaced completely apart from said 3-position gripper with the width of said crevice being at a predetermined minimum and said alarm being off, in said set position said 3-position gripper applying a holding force pinching said fish line within said crevice with said fish line being in a single-pass configuration and said alarm being off, and in said trip position said 3-position gripper pinching said fish line within said crevice with said fish line being in a single-pass configuration and said alarm being on, said 3-position gripper being respositionable from said set position to said trip position in response to tension of said fish line between said 3-position gripper and said rod tip exceeding a predetermined limit, said 3-position gripper automatically shifting from said trip position to said release position in response to tension in said fish line drawing said fish line out from within said crevice, said holding force being independent of any tension of said fish line in said crevice;

an adjustment on said housing and co-acting with said 3-position gripper to vary said predetermined limit; and a switch being 3-mode user selectable and wherein said alarm includes an audio signal, said switch having a first mode where said light and said audio signal respond to said predetermined limit that causes said gripper to move from said set position to said trip position, a second mode where said audio signal is disabled and said light responds to said predetermined limit that causes said gripper to move from said set position to said trip position, and a third mode where said light and said audio signal are disabled.

* * * * *